United States Patent
Byrne et al.

(10) Patent No.: US 7,165,685 B2
(45) Date of Patent: Jan. 23, 2007

(54) SYSTEM, METHOD, AND APPARATUS FOR IMPROVED PACKAGING OF DATA TAPE CARTRIDGES

(75) Inventors: Dennis Hurley Byrne, Tucson, AZ (US); David Michael Davis, Tucson, AZ (US); James Mitchell Karp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 10/618,028

(22) Filed: Jul. 11, 2003

(65) Prior Publication Data

US 2005/0006270 A1    Jan. 13, 2005

(51) Int. Cl.
*A47F 7/00* (2006.01)
(52) U.S. Cl. ........................................ 211/26
(58) Field of Classification Search ................. 211/26, 211/41.12, 40
See application file for complete search history.

(56) References Cited

U.S. PATENT DOCUMENTS

| | | | |
|---|---|---|---|
| 1,821,621 A * | 9/1931 | Durand | 211/40 |
| 3,907,116 A * | 9/1975 | Wolf et al. | 211/40 |
| 4,203,519 A | 5/1980 | Fujitaki | |
| 4,817,079 A | 3/1989 | Covington | |
| 4,819,801 A * | 4/1989 | Howard | 206/307 |
| 5,080,231 A | 1/1992 | Price, Jr. et al. | |
| 5,103,986 A | 4/1992 | Marlowe | |
| 5,182,686 A | 1/1993 | Lindenmeyer | |
| 6,019,230 A | 2/2000 | Hayashi | |
| 6,039,190 A * | 3/2000 | Clausen | 211/40 |
| 6,112,910 A * | 9/2000 | Baxter | 211/40 |
| 6,433,954 B1 | 8/2002 | Rinard et al. | |
| 6,557,710 B1 * | 5/2003 | Levine | 211/40 |

* cited by examiner

*Primary Examiner*—Sarah Purol
(74) *Attorney, Agent, or Firm*—Dillon & Yudell LLP

(57) ABSTRACT

A plastic cartridge holder for restraining and protecting data tape cartridges during shipping has individual cartridge slots with corrugated padding between adjacent slots and on the sides of the slots to decouple the cartridges from virtually any shock event. The cartridges do not separate or fall apart from each other when the external bundling material or shrink-wrapping is removed. The corrugations and slots hold the cartridges in place with a retention force that is firm yet comfortable for the user to overcome. The slots on the beveled corners allow individual cartridge actuation of access doors for inspection of the tape leader pins before the cartridges are removed. The opposite side of the holder has a full, cartridge-length access to the individual slots. The holder also has an access slot to allow the user to manually push all of the cartridges out of the holder simultaneously.

13 Claims, 5 Drawing Sheets

SYSTEM, METHOD, AND APPARATUS FOR IMPROVED PACKAGING OF DATA TAPE CARTRIDGES

BACKGROUND OF THE INVENTION

1. Technical Field

The present invention relates in general to an improved packaging system and, in particular, to an improved system, method, and apparatus for packaging data tape cartridges.

2. Description of the Related Art

Data tape cartridges are typically packaged at the factory in order to protect them from damage during shipping and handling. In the prior art, data tape cartridges are either individually packaged, or stacked on top of one another and then bundled together with shrink-wrapping or the like. Unfortunately, both of these conventional packaging solutions have limitations. With regard to the first solution, users of data tape cartridges typically do not prefer to handle and/or store the individual data tape cartridge cases, and there is no easy way to import the cartridges into a library input/output (I/O) station except one at a time.

With regard to the second solution, cartridges that are stacked directly against one another and then bundled together are easily damaged by shock or vibration. Such damage can occur to the cartridges themselves and/or to the media tape contained within them. Under such conditions, the shock is usually transferred throughout the whole stack of cartridges without attenuation. Thus, a shock event on one side of the stack of cartridges can damage many of the cartridges, even if they did not directly absorb the impact. Moreover, when the shrink wrap or bundling material is removed, the cartridges can be easily dropped as there is nothing to hold them in place or stabilize them from separation. Furthermore, no prior art packaging solutions provide reusability to the user as a storage device for the cartridges when the cartridges are not in use. Finally, if a user wishes to re-ship the cartridges, he or she must do so without opening the original packaging materials. The user is unable to re-ship just one or a few of the cartridges with the original packaging materials since the cartridges will not be restrained from movement and subject to additional impact or vibration damage. Thus, an improved system, method, and apparatus for packaging data tape cartridges would be desirable.

SUMMARY OF THE INVENTION

One embodiment of a system, method, and apparatus for packaging data tape cartridges is based on a ten-pack cartridge holder. However, the holder may be readily reconfigured to hold more or fewer cartridges. The holder is a simple polypropylene plastic part or similar material that meets the following requirements. The holder is inexpensive, recyclable, and does not require the user to manually handle each individual cartridge. The holder has ten individual cartridge slots with simple corrugated plastic padding between adjacent slots and on the sides of the slots to decouple the cartridges from virtually any shock event. This configuration also prevents shock transfer between adjacent ones of the cartridges. In addition, the cartridges do not separate or fall apart from each other when the external bundling material or shrink-wrapping is removed. The friction of the corrugated plastic and the interference geometry of the slots hold the cartridges in place with a retention force that is firm yet comfortable for the user to overcome.

One side of the holder provides access to the individual slots with finger slots for facilitating easy manual contact with the cartridges for moving the cartridges with respect to the holder. The opposite side of the holder has a full, cartridge-length access to the individual slots along the middle of the holder so that the cartridges can be pushed out via the finger slots. One embodiment of the invention is designed on the same center-to-center spacing as the IBM 3494 I/O library station. A simple alignment tab allows a user to manually mate the slots of the holder to the slots of the library station. An access slot in the bottom of the holder allows the user to manually push all ten of the cartridges out of the holder simultaneously and into the library station. An optional orientation marking matches the library station marking may also be provided. After the holder is loaded with a desired number of cartridges (e.g., from one to ten in the disclosed embodiment), the holder is shrink-wrapped sealed for shipping from the factory. Optional foam padding around the holder provides additional shock protection for shipping purposes, and there is no need for double-boxing. The holders are also stackable relative to each other when they are not in use in order to minimize the storage area that they require. Moreover, the holder and its shipping box are suitable for user re-shipment. Furthermore, the holder is designed to fit in a standard width file cabinet or similar storage furniture. Simple loop holders on the ends of the holder provide good user handling and can act as a mounting structure in office furniture. An inspection slot on the side of the holder allows the user to check for loose leader pins or blocks in bulk without the risk of damaging or dropping the cartridges.

The foregoing and other objects and advantages of the present invention will be apparent to those skilled in the art, in view of the following detailed description of the preferred embodiment of the present invention, taken in conjunction with the appended claims and the accompanying drawings.

BRIEF DESCRIPTION OF THE DRAWINGS

So that the manner in which the features and advantages of the invention, as well as others which will become apparent are attained and can be understood in more detail, more particular description of the invention briefly summarized above may be had by reference to the embodiment thereof which is illustrated in the appended drawings, which drawings form a part of this specification. It is to be noted, however, that the drawings illustrate only an embodiment of the invention and therefore are not to be considered limiting of its scope as the invention may admit to other equally effective embodiments.

DETAILED DESCRIPTION OF A PREFERRED EMBODIMENT

Figure 1:
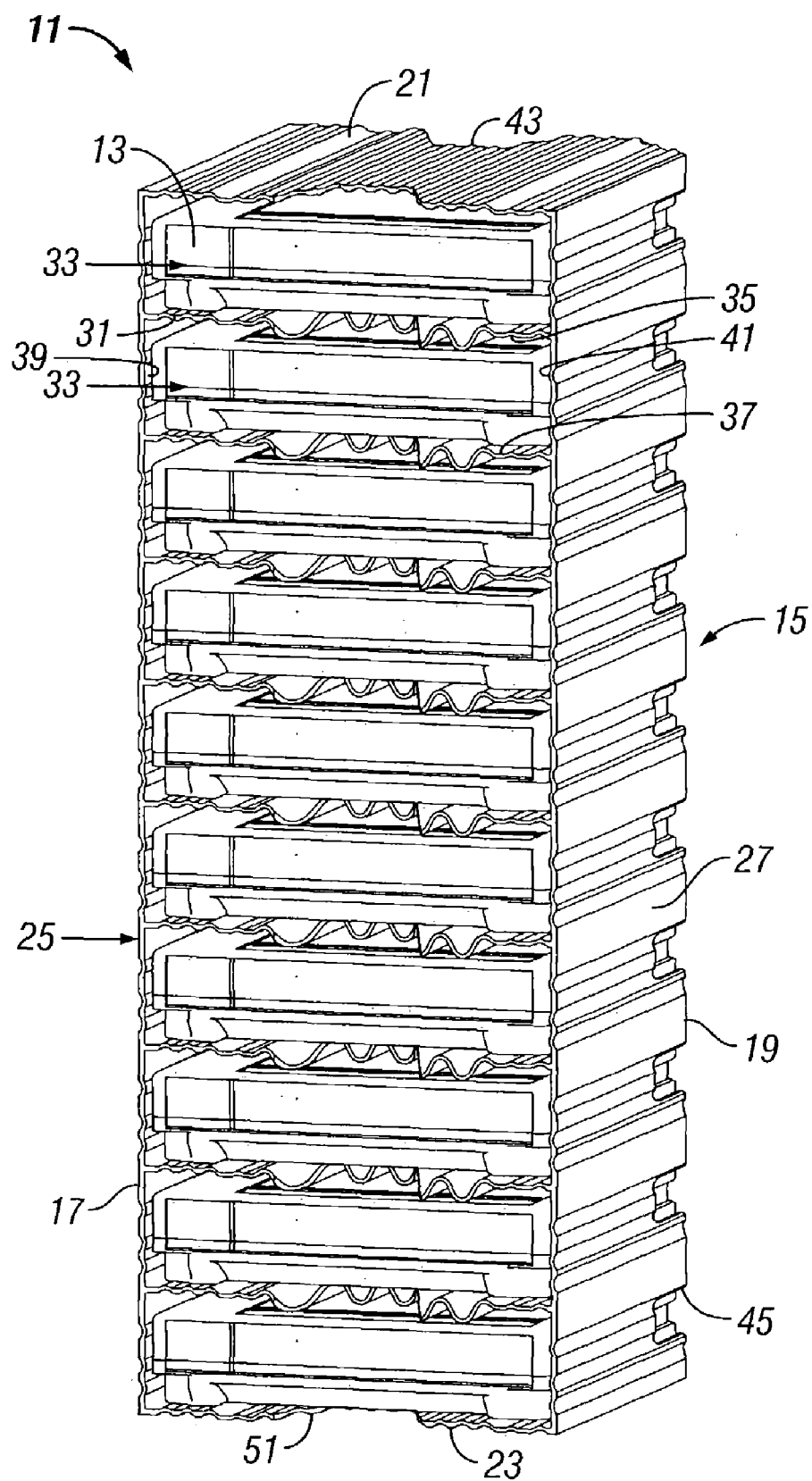
FIG. 1 is a front isometric view of one embodiment of a data tape cartridge holder constructed in accordance with the present invention and shown filled with data tape cartridges in a fully seated position.

Referring to FIGS. 1–4, one embodiment of an apparatus 11 or holder of data tape cartridges 13 is shown and constructed in accordance with the present invention. The apparatus 11 is designed to protect the data tape cartridges 13 from shock and vibration during shipping and for storing the data tape cartridges 13 while they are not in use. The apparatus 11 comprises a frame 15 having an interior that is defined by a front 17 (FIGS. 1 and 2), a rear 19 (FIGS. 3 and 4), a top 21 (FIG. 3), a bottom 23 (FIG. 4), and a pair of side walls 25, 27.

Figure 2:
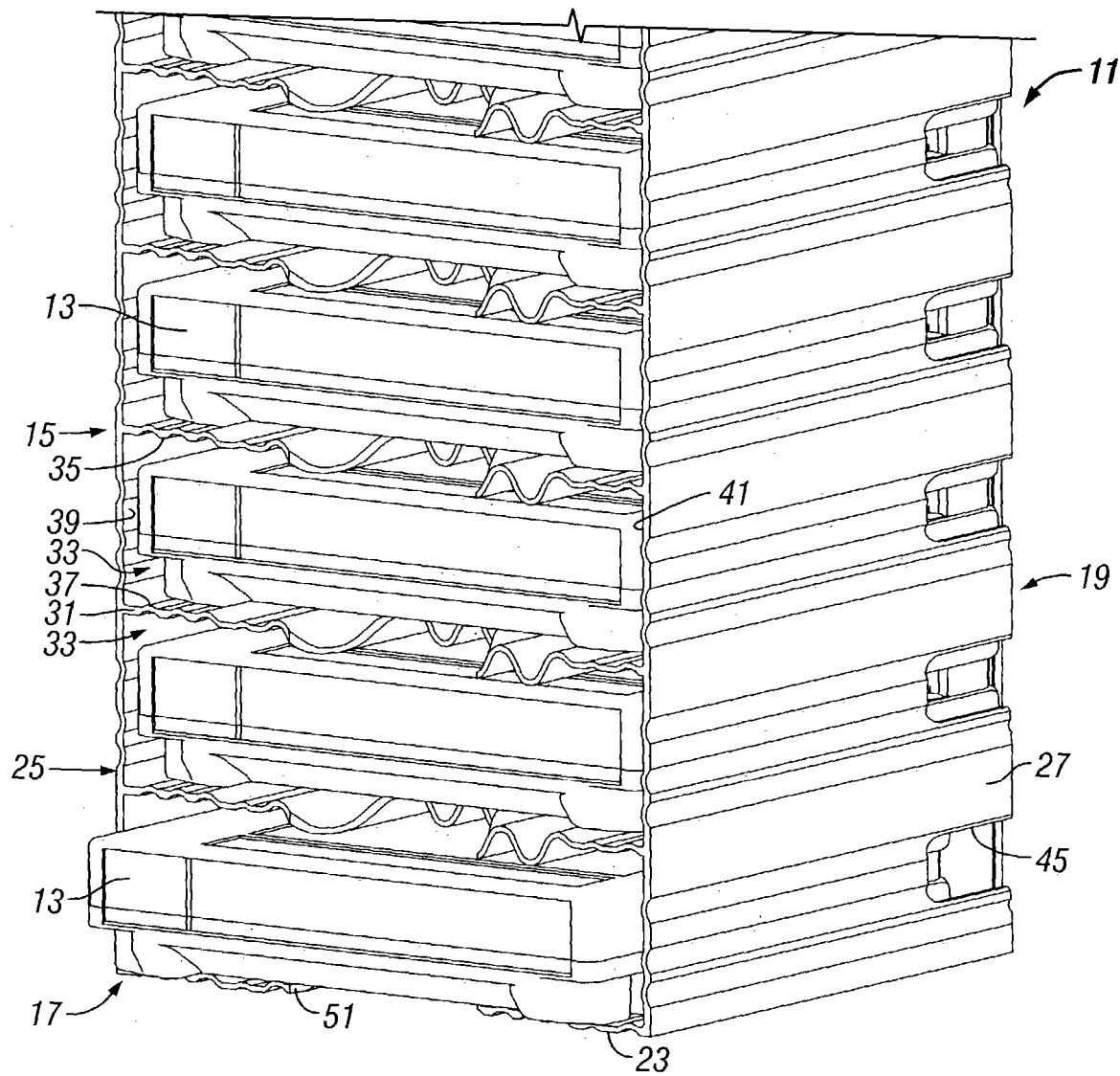
FIG. 2 is an enlarged front isometric view of a lower portion of the data tape cartridge holder of FIG. 1, with a lowermost one of the data tape cartridges shown in a slightly ejected position and the other data tape cartridges in the fully seated position.
Figure 3:
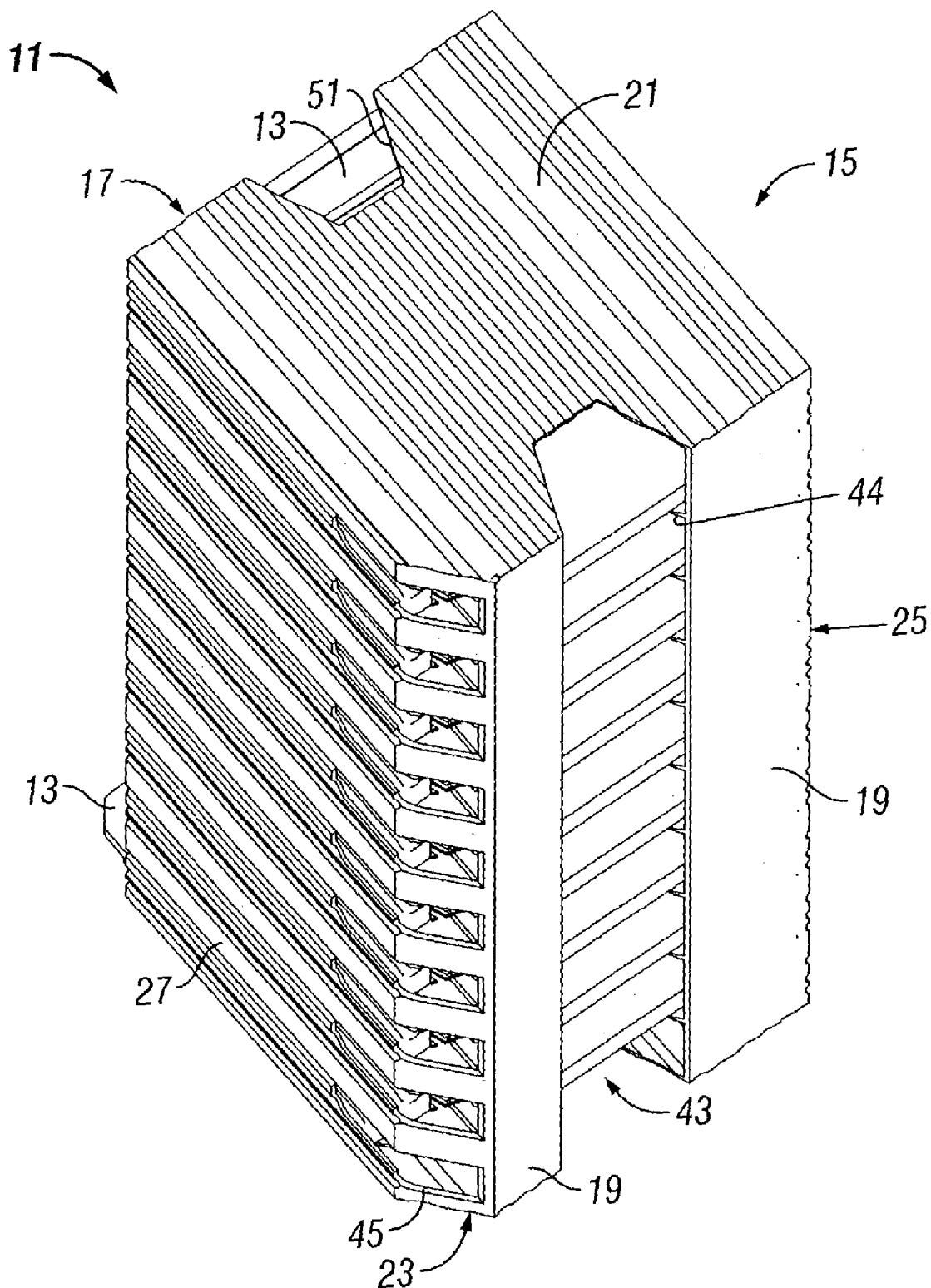
FIG. 3 is an upper rear isometric view of the data tape cartridge holder of FIG. 2.
Figure 4:
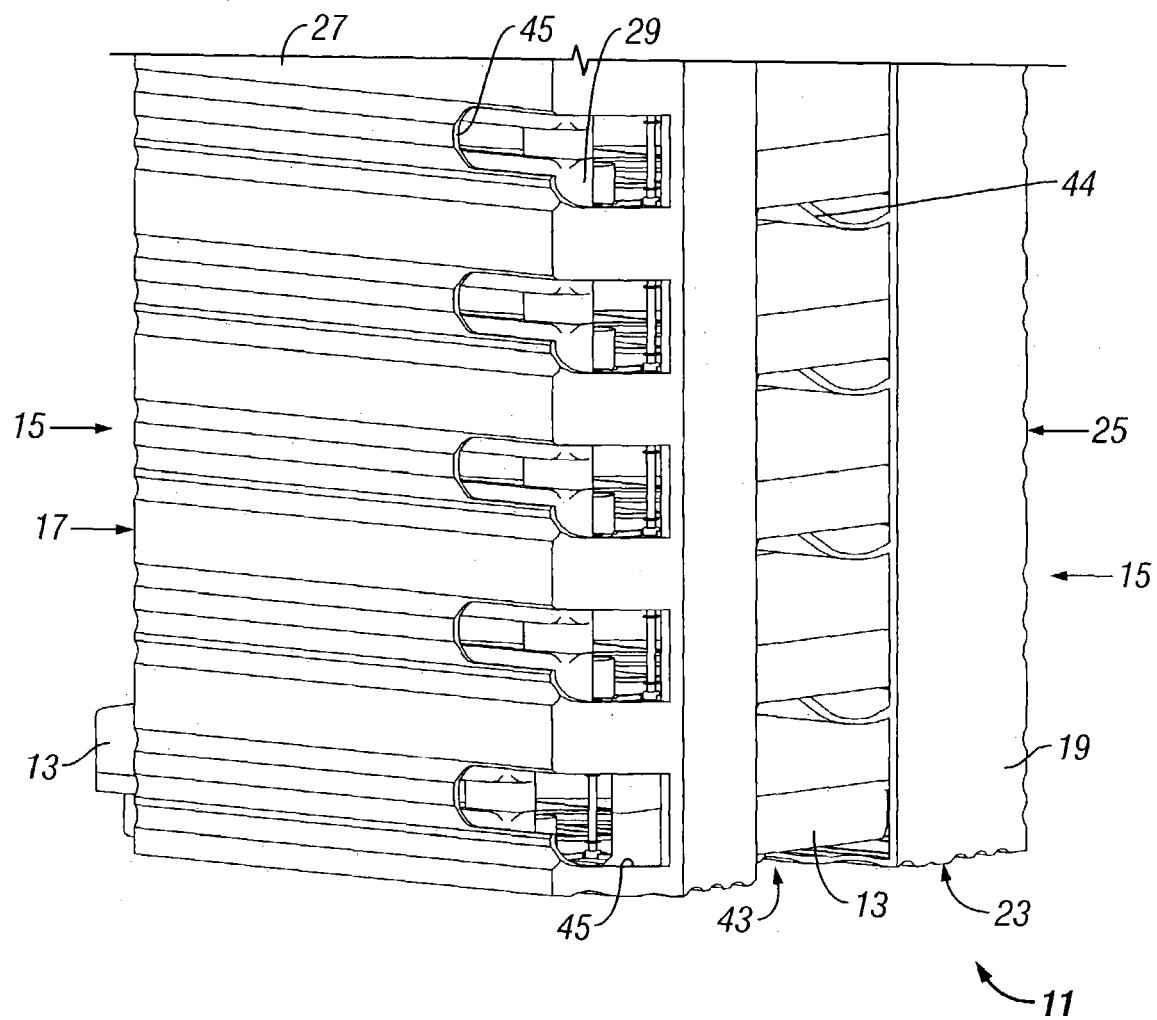
FIG. 4 is an enlarged rear isometric view of the lower portion of the data tape cartridge holder of FIG. 2.

As best shown in FIG. 2, a plurality of partitions 31 are located in and mounted to the interior of the frame 15 in a parallel configuration as shown. The frame 11 and the partitions 31 may be integrally formed together as a single piece of plastic, such as polypropylene. Each of the partitions 31 defines a pair of adjacent, parallel slots 33 that are located inside the frame as well. Each of the slots 33 has a top 35, a bottom 37, and a pair of side walls 39, 41 that are adapted to engage and retain one data tape cartridge 13. The data tape cartridges 13 are inserted into the frame 11 through the front 17 of the frame 11 in order to isolate the data tape cartridges 13 from each other. In one embodiment, the data tape cartridges 13 abut the rear 19 of the frame 11 to provide a positive confirmation to the user that, when inserted, the data tape cartridges 13 are fully seated and properly installed in the frame 11.

A rear opening 43 (FIGS. 3 and 4) is provided at and formed in the rear 19 of the frame 11. The rear opening 43 is adapted to provide simultaneous access to all of the data tape cartridges 13 in the slots 33. If desired, a force may be applied through the rear opening 43 simultaneously to all of the data tape cartridges 13 to push all of the data tape cartridges 13 out of the front 17 of the frame 11 at the same time. The rear opening 43 is also formed in the top 21 and the bottom 23 of the frame 11, such that the rear opening 43 extends from the top 21 of the frame 11 to the bottom 23 of the frame 11. In addition, each of the partitions 31 has an opening 44 formed in a rear portion thereof that is complementary in shape to the rear opening 43 formed in the rear 19 of the frame 11 in order to facilitate access to all of the cartridges 13.

Again referring to FIGS. 3 and 4, a plurality of apertures 45 are also formed in the frame 11. Each of the apertures 45 registers with one of the slots 33 and is adapted to provide access to the access door of a respective one of the data tape cartridges 13. This feature allows the leader pins of the data tape cartridges 13 to be inspected for proper seating. In one version, each of the apertures 45 is an elongated slot extending from the rear 19 of the frame 11 toward the front 17 of the frame 11. The apertures 45 are formed in one of the side walls 27 of the frame 11 for providing access to a rear portion and a side portion of respective ones of the data tape cartridges 13.

Although the frame 11 is generally rectangular, a portion or one corner of frame 11 adjacent to the apertures 45 is formed in a notch-type shape configuration (best shown in FIG. 3) in order to provide "keyed" alignment feature for the shape of the data tape cartridges 13, which also have a notch 29 (FIG. 4) on one corner. This feature allows the user to visually affirm that the data tape cartridges 13 are correctly mounted in the frame. If the notches 29 on the cartridges 13 are not aligned in this manner (i.e., adjacent to apertures 45), the cartridges 13 will not be able to be fully installed or seated in frame 11.

In the embodiment shown, the top 35, the bottom 37, and the pair of side walls 39, 41 for each of the slots 33 is corrugated, as best shown in FIG. 2. The corrugations of each slot 33 are adapted to frictionally engage a respective one of the data tape cartridges 13 in a snug yet compliant manner. The apparatus 11 also comprises a front opening 51 (see FIG. 3) that is formed in the top 21 and the bottom 23 of the frame 11 and in each of the partitions 31. The front opening 51 is adapted to provide simultaneous access to all of the data tape cartridges 13 in the slots 33. If desired, a force may be applied simultaneously to all of the data tape cartridges 13 to push all of the data tape cartridges 13 into the slots 33 toward the rear 19 of the frame 11 at the same time.

Figure 5:
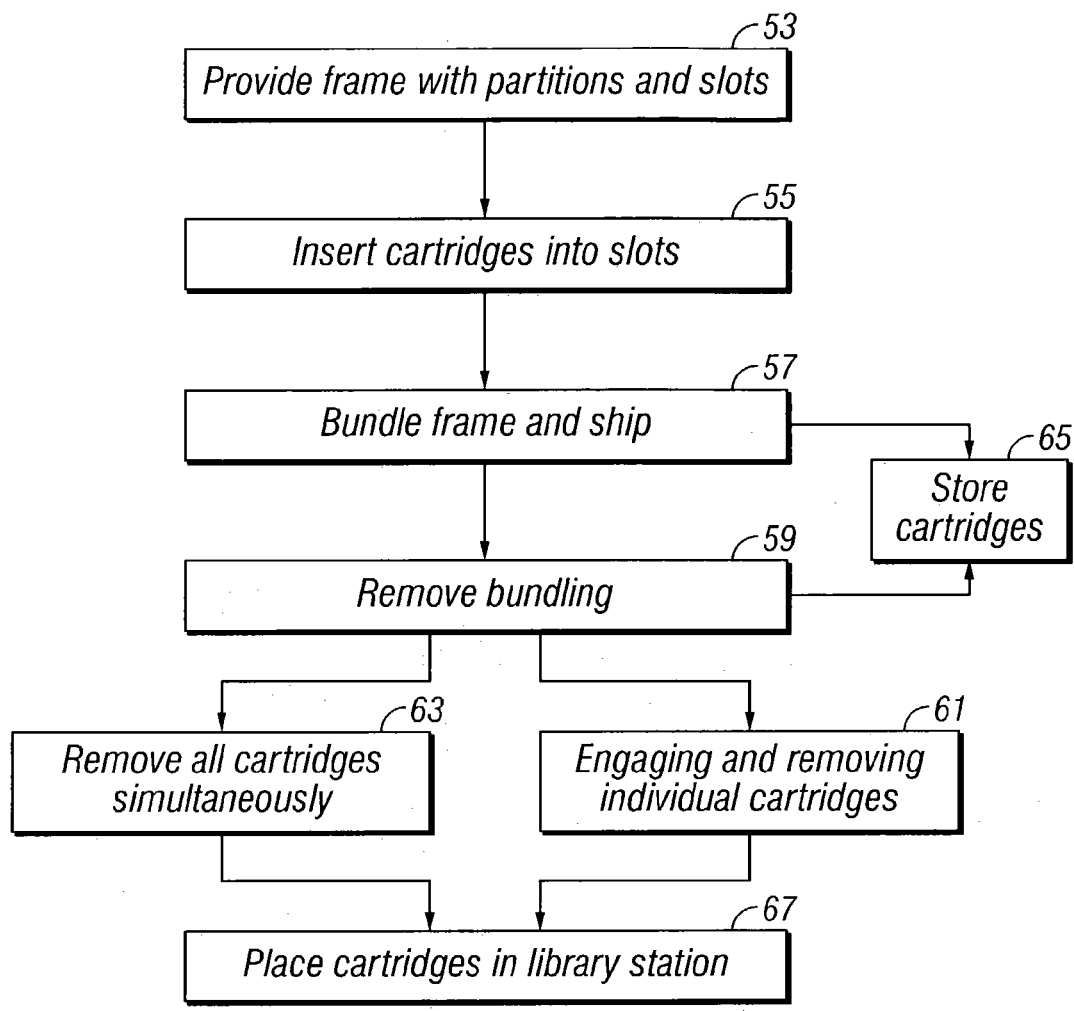
FIG. 5 is a flowchart illustrating one embodiment of a method in accordance with the present invention.

In operation (FIG. 5), the present invention comprises a method of protecting the data tape cartridges 13 from shock and vibration during shipping, and/or storing the data tape cartridges 13 when they are not in use. The method comprises providing the frame 11 with an interior and the partitions 31 in the interior in a parallel configuration, as depicted at step 53. Each of the partitions 31 defines the pair of adjacent, parallel slots 33, and each of the slots 33 has a top 35, a bottom 37, a pair of side walls 39, 41, and an aperture 45 formed in one of the side walls 41. As illustrated at step 55, the data tape cartridges 13 are inserted into respective ones of the slots 33 such that the data tape cartridges 13 are engaged and retained in the slots 33 and isolated from each other. The frame 11 is bundled, as depicted at step 57, such that the data tape cartridges 13 are secured therein, and the bundled frame is shipped. As illustrated at step 59, the bundling is removed from the frame 11 after the frame 11 is shipped. The cartridges 13 may be stored before or after the bundling is removed, as depicted at step 65.

The data tape cartridges 13 may be engaged and manipulated in at least two different ways while they are still in the frame 11. As depicted at step 61, individual ones of the data tape cartridges 13 may be engaged through their respective apertures 45 and pushed out of the slots 33 to remove them from the frame 11. Alternatively, as depicted at step 63, a force may be applied simultaneously to all of the data tape cartridges 13 to push all of the data tape cartridges 13 out of the frame 11 at the same time and directly into a library station, as illustrated at step 67.

The present invention has several advantages, including the ability to package many data tape cartridges in a single holder. The holder is a simple polypropylene plastic part that is inexpensive, recyclable, and does not require the user to manually handle each individual cartridge. The holder has corrugated plastic padding between adjacent slots and on the sides of the slots to decouple the cartridges from virtually any shock event. This configuration also prevents shock transfer between adjacent ones of the cartridges. In addition, the cartridges do not separate or fall apart from each other when the external bundling material or shrink-wrapping is removed. The friction of the corrugated plastic and the geometry of the slots hold the cartridges in place with a retention force that is firm yet comfortable for the user to overcome.

One side of the holder provides access to the individual slots with finger slots for facilitating easy manual contact with the cartridges for moving the cartridges with respect to the holder. The opposite side of the holder has a full, cartridge-length access to the individual slots along the middle of the holder so that the cartridges can be pushed out via the finger slots. One version of the holder has the same center-to-center spacing as the IBM 3494 I/O library station.

A simple alignment tab allows a user to manually mate the slots of the holder to the slots of the library station. An access slot in the bottom of the holder allows the user to manually push all ten of the cartridges out of the holder simultaneously and into the library station. An optional orientation marking matches the library station marking may also be provided.

After the holder is loaded with a desired number of cartridges (e.g., from one to ten in the disclosed embodiment), the holder is shrink-wrapped sealed for shipping from the factory. Optional foam padding around the holder provides additional shock protection for shipping purposes, and there is no need for double-boxing. The holders are also stackable relative to each other when they are not in use in order to minimize the storage area that they require. Moreover, the holder and its shipping box are suitable for user re-shipment. Furthermore, the holder is designed to fit in a standard width file cabinet or similar storage furniture. Simple loop holders on the ends of the holder provide good user handling and can act as a mounting structure in office furniture. An inspection slot on the side of the holder allows the user to check for loose leader pins in bulk without the risk of damaging or dropping the cartridges.

While the invention has been shown or described in only some of its forms, it should be apparent to those skilled in the art that it is not so limited, but is susceptible to various changes without departing from the scope of the invention.

What is claimed is:

1. An apparatus for protecting data tape cartridges, said apparatus comprising:
   a frame having an interior defined by a front, a rear, a top, a bottom, and a pair of side walls;
   a plurality of partitions located in and mounted to the interior of the frame in a parallel configuration, each of the partitions defining a pair of adjacent, parallel slots inside the frame, each of the slots having a top, a bottom, and a pair of side walls adapted to engage and retain a data tape cartridge therein through the front of the frame in order to isolate the data tape cartridges from each other, wherein the top, the bottom, and the pair of side walls for each of the slots are corrugated;
   a rear opening formed in the rear of the frame adapted to provide simultaneous access to all of the data tape cartridges in the slots and, if desired, for allowing a force to be applied simultaneously to all of the data tape cartridges to push all of the data tape cartridges out of the front of the frame at the same time; and
   a plurality of apertures formed in the frame, each of the apertures registering with one of the slots and adapted to provide access to a respective one of the data tape cartridges for inspecting said respective one of the data tape cartridges.

2. The apparatus of claim 1, wherein the top, the bottom, and the pair of side walls of each slot are adapted to frictionally engage a respective one of the data tape cartridges in a snug yet compliant manner.

3. The apparatus of claim 1, wherein the rear opening is also formed in the top and the bottom of the frame, such that the rear opening extends from the top of the frame to the bottom of the frame.

4. The apparatus of claim 3, wherein each of the partitions has an opening formed in a rear portion thereof that is complementary in shape to the rear opening formed in the rear of the frame.

5. The apparatus of claim 1, wherein each of the apertures is an elongated slot extending from the rear of the frame toward the front of the frame.

6. The apparatus of claim 1, wherein the apertures are formed in one of the side walls of the frame for providing access to a rear portion and a side portion of respective ones of the data tape cartridges.

7. The apparatus of claim 1, wherein the frame and the partitions are integrally formed as a single piece of plastic.

8. The apparatus of claim 1, further comprising a front opening formed in the top and the bottom of the frame and in each of the partitions and adapted to provide simultaneous access to all of the data tape cartridges in the slots and, if desired, for allowing a force to be applied simultaneously to all of the data tape cartridges to push all of the data tape cartridges into the slots toward the rear of the frame at the same time.

9. A system for protecting data tape cartridges from shock and vibration during shipping and for storing the data tape cartridges, the system comprising:
   a frame having an interior defined by a front, a rear, a top, a bottom, and a pair of side walls;
   a plurality of partitions located in and mounted to the interior of the frame in a parallel configuration, each of the partitions defining a pair of adjacent, parallel slots inside the frame, and each of the slots having a top, a bottom, and a pair of side walls that engage and retain one data tape cartridge therein to isolate the data tape cartridges from each other, wherein the top, the bottom, and the pair of side walls for each of the slots are corrugated;
   a rear opening formed in the rear of the frame that provides simultaneous access to all of the data tape cartridges in the slots and allows a force to be applied simultaneously to all of the data tape cartridges to push all of the data tape cartridges out of the frame at the same time; and
   a plurality of apertures formed in the frame, each of the apertures registering with one of the slots and providing access to a respective one of the data tape cartridges for inspecting said respective one of the data tape cartridges for proper tape leader pin seating.

10. The system of claim 9, wherein the top, the bottom, and the pair of side walls of each slot frictionally engage a respective one of the data tape cartridges with a snug yet compliant fit.

11. The system of claim 9, wherein the rear opening is also formed in the top and the bottom of the frame, such that the rear opening extends from the top of the frame to the bottom of the frame, and wherein each of the partitions has an opening formed in a rear portion thereof that is complementary in shape to the rear opening.

12. The system of claim 9, wherein each of the apertures is an elongated slot extending from the rear of the frame toward the front of the frame and is formed in one of the side walls of the frame to provide access to a rear portion and a side portion of respective ones of the data tape cartridges.

13. The system of claim 10, further comprising a front opening formed in the top and the bottom of the frame and in each of the partitions that provides simultaneous access to all of the data tape cartridges in the slots and allows a force to be applied simultaneously to all of the data tape cartridges to push all of the data tape cartridges into the slots toward the rear of the frame at the same time.

* * * * *